(12) United States Patent
Hasan et al.

(10) Patent No.: US 11,577,624 B2
(45) Date of Patent: Feb. 14, 2023

(54) LOW VOLTAGE BATTERY SOC CONFIRMATION AND CELL BALANCING

(71) Applicant: GM GLOBAL TECHNOLOGY OPERATIONS LLC, Detroit, MI (US)

(72) Inventors: Saad Hasan, Detroit, MI (US); Dave G. Rich, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 236 days.

(21) Appl. No.: 16/893,948

(22) Filed: Jun. 5, 2020

(65) Prior Publication Data

US 2020/0384888 A1 Dec. 10, 2020

Related U.S. Application Data

(60) Provisional application No. 62/857,510, filed on Jun. 5, 2019.

(51) Int. Cl.
| | |
|---|---|
| *H02J 7/00* | (2006.01) |
| *H02J 7/14* | (2006.01) |
| *B60L 58/15* | (2019.01) |
| *B60L 58/16* | (2019.01) |
| *B60L 58/14* | (2019.01) |

(52) U.S. Cl.
CPC ............... *B60L 58/15* (2019.02); *B60L 58/14* (2019.02); *B60L 58/16* (2019.02); *B60L 2240/547* (2013.01); *B60L 2240/549* (2013.01)

(58) Field of Classification Search
CPC .......... B60L 58/15; B60L 58/16; B60L 58/14; B60L 2240/547; B60L 2240/549

USPC .................................................. 320/104, 109
See application file for complete search history.

(56) References Cited

U.S. PATENT DOCUMENTS

| | | | |
|---|---|---|---|
| 6,909,201 B2 | 6/2005 | Murty et al. | |
| 9,184,582 B2 | 11/2015 | Koch et al. | |
| 9,440,600 B2 | 9/2016 | Koch et al. | |
| 9,911,249 B2 | 3/2018 | Koch et al. | |
| 10,395,442 B2 | 8/2019 | Conell et al. | |
| 2012/0169288 A1* | 7/2012 | Ueki ................... | H01M 10/448 702/58 |
| 2013/0314050 A1* | 11/2013 | Matsubara ............ | H02J 7/0077 320/134 |
| 2014/0145681 A1* | 5/2014 | Vuorilehto ............ | H02J 7/0016 320/134 |
| 2014/0266060 A1* | 9/2014 | Ying ..................... | H02J 7/0048 320/134 |

(Continued)

OTHER PUBLICATIONS

U.S. Appl. No. 16/183,803, filed Nov. 8, 2018, Winger et al.

(Continued)

*Primary Examiner* — Alexis B Pacheco
(74) *Attorney, Agent, or Firm* — Harness, Dickey & Pierce, P.L.C.

(57) ABSTRACT

A battery system includes at least one battery including a plurality of cells and a hybrid control module configured to monitor a differential capacity of the at least one battery, determine when the monitored differential capacity of the at least one battery corresponds to a predetermined differential capacity of the at least one battery, and determine a state of charge of the battery in response to the determination that the monitored differential capacity corresponds to the predetermined differential capacity.

5 Claims, 9 Drawing Sheets

(56) References Cited

U.S. PATENT DOCUMENTS

| | | | |
|---|---|---|---|
| 2015/0066406 A1* | 3/2015 | Sun | G01R 31/392 |
| | | | 702/63 |
| 2019/0202299 A1* | 7/2019 | Oh | H02J 7/045 |
| 2019/0359063 A9 | 11/2019 | Jiang et al. | |
| 2019/0393569 A1 | 12/2019 | Rich et al. | |
| 2020/0018796 A1 | 1/2020 | Conell et al. | |
| 2020/0044437 A1 | 2/2020 | Conell et al. | |
| 2020/0346558 A1* | 11/2020 | Luo | B60L 58/12 |
| 2021/0197691 A1* | 7/2021 | Stefanopoulou | B60L 50/64 |

OTHER PUBLICATIONS

U.S. Appl. No. 16/183,895, filed Nov. 8, 2018, Rich et al.
U.S. Appl. No. 16/184,126, filed Nov. 8, 2018, Winger et al.
U.S. Appl. No. 16/487,914, filed Aug. 22, 2019, Yu et al.

* cited by examiner

LOW VOLTAGE BATTERY SOC CONFIRMATION AND CELL BALANCING

CROSS-REFERENCE TO RELATED APPLICATIONS

This application claims the benefit of U.S. Provisional Application No. 62/857,510, filed on Jun. 5, 2019. The entire disclosure of the application referenced above is incorporated herein by reference.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicles and more particularly to battery systems of vehicles.

Some types of vehicles include only an internal combustion engine that generates propulsion torque. Pure electric vehicles include a battery system and an electric motor. Hybrid vehicles include both an internal combustion engine and one or more electric motors. Some types of hybrid vehicles utilize the electric motor and the internal combustion engine in an effort to achieve greater fuel efficiency than if only the internal combustion engine was used. Some types of hybrid vehicles utilize the electric motor and the internal combustion engine to achieve greater torque output than the internal combustion could achieve by itself.

Some example types of hybrid vehicles include parallel hybrid vehicles, series hybrid vehicles, and other types of hybrid vehicles. In a parallel hybrid vehicle, the electric motor works in parallel with the engine to combine power and range advantages of the engine with efficiency and regenerative braking advantages of electric motors. In a series hybrid vehicle, the engine drives a generator to produce electricity for the electric motor, and the electric motor drives a transmission. This allows the electric motor to assume some of the power responsibilities of the engine, which may permit the use of a smaller and possibly more efficient engine.

SUMMARY

A battery system includes at least one battery including a plurality of cells and a hybrid control module configured to monitor a differential capacity of the at least one battery, determine when the monitored differential capacity of the at least one battery corresponds to a predetermined differential capacity of the at least one battery, and determine a state of charge of the battery in response to the determination that the monitored differential capacity corresponds to the predetermined differential capacity.

In other features, the predetermined differential capacity corresponds to an inflection point in a voltage profile of the at least one battery.

In other features, the inflection point corresponds to a transition between a first region of the voltage profile and a second region of the voltage profile.

In other features, the first region of the voltage profile is flat and the second region of the voltage profile is not flat.

In other features, in the first region, an open circuit voltage of the battery varies by less than 100 mV and the state of charge varies by at least 50%.

In other features, the hybrid control module is further configured to determine when the monitored differential capacity of the at least one battery corresponds to a second predetermined differential capacity of the at least one battery corresponding to a first inflection point in a voltage profile of the at least one battery and the second predetermined differential capacity corresponds to a second inflection point in the voltage profile of the at least one battery, and calculate an energy of the battery between the first inflection point and the second inflection point.

In other features, the hybrid control module is further configured to calculate at least one of a state of health of the battery and a remaining life of the battery based on the calculated energy.

In other features, a vehicle includes the battery system.

A battery system includes at least one battery including a plurality of cells and a hybrid control module configured to selectively allow a discharge current to flow from a first cell of the plurality of cells to reduce a charge of the first cell and, while the discharge current is flowing from the first cell, connect a second cell of the plurality of cells to a charging system to charge the second cell.

In other features, the first cell has maximum voltage among the plurality of cells and the second cell has a minimum voltage of the plurality of cells.

In other features, the hybrid control module is configured to reduce the charge of the first cell while charging the second cell until each of the plurality of cells has a voltage greater than a threshold.

In other features, the threshold corresponds to a desired state of charge of the battery.

In other features, the desired state of charge corresponds to a differential capacity inflection point in a voltage profile of the battery.

In other features the battery system includes a plurality of switches configured to selectively connect respective ones of the plurality of cells to ground.

In other features, the hybrid control module is configured to close a first switch of the plurality of switches to connect the first cell to ground to reduce the charge of the first cell.

In other features, the hybrid control module is configured to reduce the charge of the first cell and charge the second cell in response to a determination that an imbalance between the first cell and the second cell is greater than a threshold.

In other features, the hybrid control module is configured to reduce the charge of the first cell and charge the second cell in response to a determination that a voltage of the first cell is greater than an upper limit.

In other features, the hybrid control module is configured to reduce the charge of the first cell and charge the second cell in response to a determination that a voltage of the second cell less than a lower limit.

In other features, a vehicle includes the battery system and the battery system is configured to provide power to the vehicle while the hybrid control module is reducing the charge of the first cell and charging the second cell.

A battery system for a vehicle includes at least one battery including a plurality of cells, a plurality of switches configured to selectively connect respective ones of the plurality of cells to ground, and a hybrid control module configured to selectively allow a discharge current to flow from a first cell of the plurality of cells to reduce a charge of the first cell, while the discharge current is flowing from the first cell, connect a second cell of the plurality of cells to a charging system to charge the second cell, and continue to reduce the charge of the first cell while charging the second cell until each of the plurality of cells has a voltage greater than a threshold corresponding to a desired state of charge of the battery.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An electric or hybrid vehicle includes a battery having one or more cells and multiple sets of output terminals for outputting respective voltages. For example, the battery includes one or more first sets of output terminals on a housing of the battery for outputting a first operating voltage (e.g., 12 V or 48 V) and one or more sets of second output terminals on the housing for outputting a second operating voltage (e.g., 48 V or 12V). The battery includes a plurality of individually housed battery modules. One or more of the battery modules may correspond to a dynamically adjustable battery system including a plurality of batteries and a plurality of switches. A switch control module controls the switches to connect individual ones of the batteries of the adjustable battery system to different output terminals and to provide target capacities and output voltages at the output terminals. The switch control module may set the target capacities, for example, based on a mode of operation of the vehicle (e.g., cranking, auxiliary, run, etc.).

A state of charge (SOC) of a battery may vary between 0 and 100%. Battery operations, including charging and discharging capability, power availability, cell rebalancing, etc., are dependent upon accurate calculation and reporting of SOC and other performance parameters (e.g., state of health (SOH)). In some systems, a reconfirmation process is performed periodically to determine SOC. Battery and vehicle use are limited during the reconfirmation process, and fuel economy in hybrid vehicles may be reduced. Further, the reconfirmation process may only be performed at near 0% or 100% SOC, requiring completely discharging or charging the battery, respectively.

In battery systems with chemistries having sloped voltage profiles (e.g., sloped SOC vs. OCV curves), SOC can be reconfirmed after short rest periods. However, some battery chemistries (e.g., lithium phosphates, such as lithium iron phosphate) have a flat voltage profile (i.e., a flat relationship between open circuit voltage (OCV) and SOC). Reconfirmation of SOC for battery chemistries having flat voltage profiles may not be practical due to reduce accuracy, resolution, etc. Accordingly, it may be difficult to determine OCV and SOC in some conditions. Further, in batteries with multiple cells, cell balancing is required to accurately calculate SOC. However, cell imbalance may be too difficult to detect in batteries with a flat voltage profile.

Battery systems and methods according to the present disclosure calculate and report accurate SOC, SOH, and power availability without performing a reconfirmation process at 0 or 100% SOC. Further, cell balancing may be performed during vehicle and battery use. For example, SOC may be calculated using differential capacity (dQ/dV) and/or differential voltage (dV/dQ) inflection points in the voltage profile of the battery.

Figure 1:
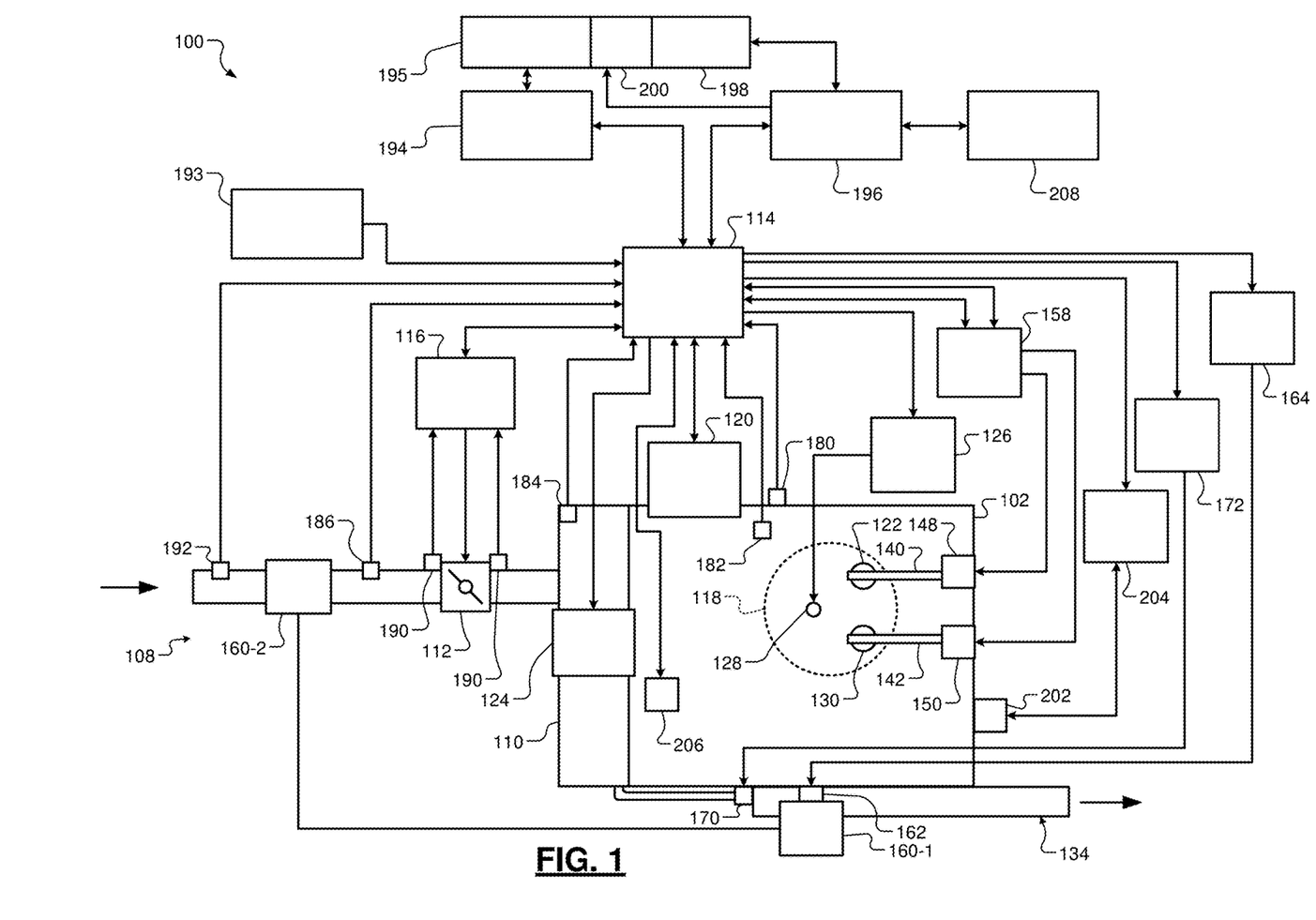
FIG. 1 is a functional block diagram of an example engine control system.

Referring now to FIG. 1, a functional block diagram of an example powertrain system 100 is presented. The powertrain system 100 of a vehicle includes an engine 102 that combusts an air/fuel mixture to produce torque. The vehicle may be non-autonomous or autonomous.

Air is drawn into the engine 102 through an intake system 108. The intake system 108 may include an intake manifold 110 and a throttle valve 112. For example only, the throttle valve 112 may include a butterfly valve having a rotatable blade. An engine control module (ECM) 114 controls a throttle actuator module 116, and the throttle actuator module 116 regulates opening of the throttle valve 112 to control airflow into the intake manifold 110.

Air from the intake manifold 110 is drawn into cylinders of the engine 102. While the engine 102 includes multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders under some circumstances, which may improve fuel efficiency.

The engine 102 may operate using a four-stroke cycle or another suitable engine cycle. The four strokes of a four-stroke cycle, described below, will be referred to as the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes. For four-stroke engines, one engine cycle may correspond to two crankshaft revolutions.

When the cylinder 118 is activated, air from the intake manifold 110 is drawn into the cylinder 118 through an intake valve 122 during the intake stroke. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers/ports associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression causes ignition of the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. Some types of engines, such as homogenous charge compression ignition (HCCI) engines may perform both compression ignition and spark ignition. The timing of the spark may be specified relative to the time when the piston is at its topmost position, which will be referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with the position of the crankshaft. The spark actuator module 126 may disable provision of spark to deactivated cylinders or provide spark to deactivated cylinders.

During the combustion stroke, the combustion of the air/fuel mixture drives the piston down, thereby driving the crankshaft. The combustion stroke may be defined as the time between the piston reaching TDC and the time when the piston returns to a bottom most position, which will be referred to as bottom dead center (BDC).

During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118). While camshaft-based valve actuation is shown and has been discussed, camless valve actuators may be implemented. While separate intake and exhaust camshafts are shown, one camshaft having lobes for both the intake and exhaust valves may be used.

The cylinder actuator module 120 may deactivate the cylinder 118 by disabling opening of the intake valve 122 and/or the exhaust valve 130. The time when the intake valve 122 is opened may be varied with respect to piston TDC by an intake cam phaser 148. The time when the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. In various implementations, cam phasing may be omitted. Variable valve lift (not shown) may also be controlled by the phaser actuator module 158. In various other implementations, the intake valve 122 and/or the exhaust valve 130 may be controlled by actuators other than a camshaft, such as electromechanical actuators, electrohydraulic actuators, electromagnetic actuators, etc.

The engine 102 may include zero, one, or more than one boost device that provides pressurized air to the intake manifold 110. For example, FIG. 1 shows a turbocharger including a turbocharger turbine 160-1 that is driven by exhaust gases flowing through the exhaust system 134. A supercharger is another type of boost device.

The turbocharger also includes a turbocharger compressor 160-2 that is driven by the turbocharger turbine 160-1 and that compresses air leading into the throttle valve 112. A wastegate (WG) 162 controls exhaust flow through and bypassing the turbocharger turbine 160-1. Wastegates can also be referred to as (turbocharger) turbine bypass valves. The wastegate 162 may allow exhaust to bypass the turbocharger turbine 160-1 to reduce intake air compression provided by the turbocharger. The ECM 114 may control the turbocharger via a wastegate actuator module 164. The wastegate actuator module 164 may modulate the boost of the turbocharger by controlling an opening of the wastegate 162.

A cooler (e.g., a charge air cooler or an intercooler) may dissipate some of the heat contained in the compressed air charge, which may be generated as the air is compressed. Although shown separated for purposes of illustration, the turbocharger turbine 160-1 and the turbocharger compressor 160-2 may be mechanically linked to each other, placing intake air in close proximity to hot exhaust. The compressed air charge may absorb heat from components of the exhaust system 134.

The engine 102 may include an exhaust gas recirculation (EGR) valve 170, which selectively redirects exhaust gas back to the intake manifold 110. The EGR valve 170 may receive exhaust gas from upstream of the turbocharger turbine 160-1 in the exhaust system 134. The EGR valve 170 may be controlled by an EGR actuator module 172.

Crankshaft position may be measured using a crankshaft position sensor 180. An engine speed may be determined based on the crankshaft position measured using the crankshaft position sensor 180. A temperature of engine coolant may be measured using an engine coolant temperature (ECT) sensor 182. The ECT sensor 182 may be located within the engine 102 or at other locations where the coolant is circulated, such as a radiator (not shown).

A pressure within the intake manifold 110 may be measured using a manifold absolute pressure (MAP) sensor 184. In various implementations, engine vacuum, which is the difference between ambient air pressure and the pressure within the intake manifold 110, may be measured. A mass flow rate of air flowing into the intake manifold 110 may be measured using a mass air flow (MAF) sensor 186. In various implementations, the MAF sensor 186 may be located in a housing that also includes the throttle valve 112.

Position of the throttle valve 112 may be measured using one or more throttle position sensors (TPS) 190. A temperature of air being drawn into the engine 102 may be measured using an intake air temperature (IAT) sensor 192. One or more other sensors 193 may also be implemented. The other sensors 193 include an accelerator pedal position (APP) sensor, a brake pedal position (BPP) sensor, may include a clutch pedal position (CPP) sensor (e.g., in the case of a manual transmission), and may include one or more other types of sensors. An APP sensor measures a position of an accelerator pedal within a passenger cabin of the vehicle. A BPP sensor measures a position of a brake pedal within a passenger cabin of the vehicle. A CPP sensor measures a position of a clutch pedal within the passenger cabin of the vehicle. The other sensors 193 may also include one or more acceleration sensors that measure longitudinal (e.g., fore/aft)

acceleration of the vehicle and latitudinal acceleration of the vehicle. An accelerometer is an example type of acceleration sensor, although other types of acceleration sensors may be used. The ECM 114 may use signals from the sensors to make control decisions for the engine 102.

The ECM 114 may communicate with a transmission control module 194, for example, to coordinate engine operation with gear shifts in a transmission 195. The ECM 114 may communicate with a hybrid control module 196, for example, to coordinate operation of the engine 102 and an electric motor 198. While the example of one electric motor is provided, multiple electric motors may be implemented. The electric motor 198 may be a permanent magnet electric motor or another suitable type of electric motor that outputs voltage based on back electromagnetic force (EMF) when free spinning, such as a direct current (DC) electric motor or a synchronous electric motor. In various implementations, various functions of the ECM 114, the transmission control module 194, and the hybrid control module 196 may be integrated into one or more modules.

Each system that varies an engine parameter may be referred to as an engine actuator. Each engine actuator has an associated actuator value. For example, the throttle actuator module 116 may be referred to as an engine actuator, and the throttle opening area may be referred to as the actuator value. In the example of FIG. 1, the throttle actuator module 116 achieves the throttle opening area by adjusting an angle of the blade of the throttle valve 112.

The spark actuator module 126 may also be referred to as an engine actuator, while the corresponding actuator value may be the amount of spark advance relative to cylinder TDC. Other engine actuators may include the cylinder actuator module 120, the fuel actuator module 124, the phaser actuator module 158, the wastegate actuator module 164, and the EGR actuator module 172. For these engine actuators, the actuator values may correspond to a cylinder activation/deactivation sequence, fueling rate, intake and exhaust cam phaser angles, target wastegate opening, and EGR valve opening, respectively.

The ECM 114 may control the actuator values in order to cause the engine 102 to output torque based on a torque request. The ECM 114 may determine the torque request, for example, based on one or more driver inputs, such as an APP, a BPP, a CPP, and/or one or more other suitable driver inputs. The ECM 114 may determine the torque request, for example, using one or more functions or lookup tables that relate the driver input(s) to torque requests.

Under some circumstances, the hybrid control module 196 controls the electric motor 198 to output torque, for example, to supplement engine torque output. The hybrid control module 196 may also control the electric motor 198 to output torque for vehicle propulsion at times when the engine 102 is shut down.

The hybrid control module 196 applies electrical power from a battery 208 to the electric motor 198 to cause the electric motor 198 to output positive torque. The battery 208 according to the principles of the present disclosure includes one or more adjustable battery systems as discussed below in more detail. The electric motor 198 may output torque, for example, to an input shaft of the transmission 195, to an output shaft of the transmission 195, or to another component. A clutch 200 may be implemented to couple the electric motor 198 to the transmission 195 and to decouple the electric motor 198 from the transmission 195. One or more gearing devices may be implemented between an output of the electric motor 198 and an input of the transmission 195 to provide one or more predetermined gear ratios between rotation of the electric motor 198 and rotation of the input of the transmission 195. In various implementations, the electric motor 198 may be omitted.

The ECM 114 starts the engine 102 via a starter motor 202. The ECM 114 or another suitable module of the vehicle engages the starter motor 202 with the engine 102 for an engine startup event. For example only, the ECM 114 may engage the starter motor 202 with the engine 102 when a key ON command is received. A driver may input a key ON command, for example, via actuating one or more ignition keys, buttons, and/or switches of the vehicle or of a key fob of the vehicle. The starter motor 202 may engage a flywheel coupled to the crankshaft or one or more other suitable components that drive rotation of the crankshaft.

The ECM 114 may also start the engine in response to an auto-start command during an auto-stop/start event or to an engine start command for a sailing event. Auto-stop/start events include shutting down the engine 102 while the vehicle is stopped, the driver has depressed the brake pedal, and the driver has not input a key OFF command. An auto-start command may be generated while the engine 102 is shut down for an auto-stop/start event, for example, when a driver releases the brake pedal and/or depresses the accelerator pedal.

Sail events may include the ECM 114 shutting down the engine 102 when the vehicle is moving (e.g., vehicle speed greater than a predetermined speed, such as 50 miles per hour), the driver is not actuating the accelerator pedal, and the driver has not input a key OFF command. An engine start command may be generated while the engine 102 is shut down for a sail event, for example, when a driver depresses the accelerator pedal. The driver may input a key OFF command, for example, via actuating the one or more ignition keys, buttons, and/or switches, as discussed above.

A starter motor actuator, such as a solenoid, may actuate the starter motor 202 into engagement with the engine 102. For example only, the starter motor actuator may engage a starter pinion with a flywheel coupled to the crankshaft. In various implementations, the starter pinion may be coupled to the starter motor 202 via a driveshaft and a one-way clutch. A starter actuator module 204 controls the starter motor actuator and the starter motor 202 based on signals from a starter control module, as discussed further below. In various implementations, the starter motor 202 may be maintained in engagement with the engine 102.

In response to a command to start the engine 102 (e.g., an auto-start command, an engine start command for an end of a sail event, or when a key ON command is received), the starter actuator module 204 supplies current to the starter motor 202 to start the engine 102. The starter actuator module 204 may also actuate the starter motor actuator to engage the starter motor 202 with the engine 102. The starter actuator module 204 may supply current to the starter motor 202 after engaging the starter motor 202 with the engine 102, for example, to allow for teeth meshing.

The application of current to the starter motor 202 drives rotation of the starter motor 202, and the starter motor 202 drives rotation of the crankshaft (e.g., via the flywheel). The period of the starter motor 202 driving the crankshaft to start the engine 102 may be referred to as engine cranking.

The starter motor 202 draws power from the battery 208 to start the engine 102. Once the engine 102 is running after the engine startup event, the starter motor 202 disengages or is disengaged from the engine 102, and current flow to the starter motor 202 may be discontinued. The engine 102 may be considered running, for example, when an engine speed exceeds a predetermined speed, such as a predetermined idle speed. For example only, the predetermined idle speed may be approximately 700 revolutions per minute (rpm) or another suitable speed. Engine cranking may be said to be completed when the engine 102 is running.

A generator 206 converts mechanical energy of the engine 102 into alternating current (AC) power. For example, the generator 206 may be coupled to the crankshaft (e.g., via gears or a belt) and convert mechanical energy of the engine 102 into AC power by applying a load to the crankshaft. The generator 206 rectifies the AC power into DC power and stores the DC power in the battery 208. Alternatively, a rectifier that is external to the generator 206 may be implemented to convert the AC power into DC power. The generator 206 may be, for example, an alternator. In various implementations, such as in the case of a belt alternator starter (BAS), the starter motor 202 and the generator 206 may be implemented together.

Figure 2:
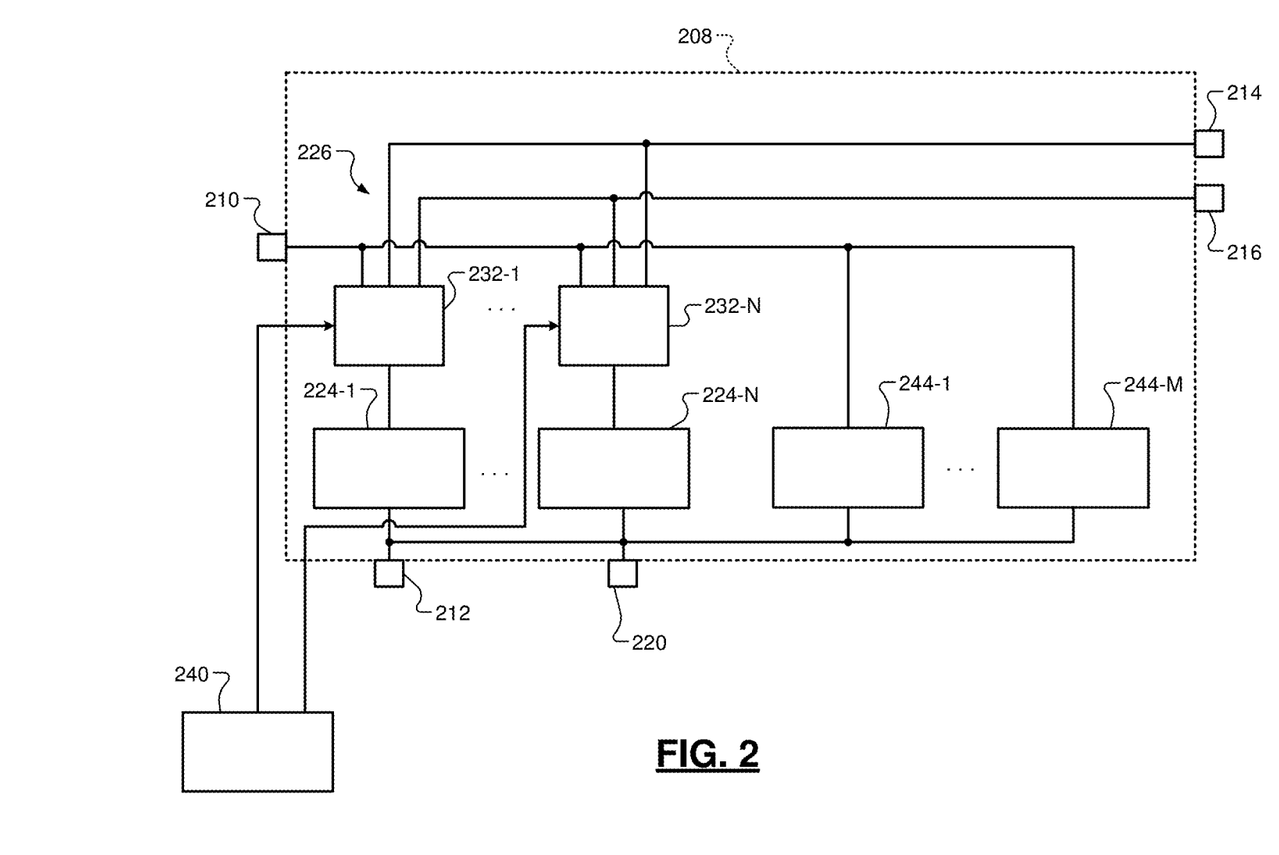
FIG. 2 is a functional block diagram an example battery system of a vehicle.

FIG. 2 is a functional block diagram of an example battery system of the vehicle. The battery system includes the battery 208 discussed above.

The battery 208 has two or more different sets of output terminals to provide two or more direct current (DC) operating voltages. Each set of output terminals includes a positive terminal and a negative terminal. Two or more sets of output terminals may share a negative terminal, or the negative terminals of two or more sets may be internally connected within the battery 208 or externally connected. For example only, the battery 208 may have a first positive (e.g., 48 Volt (V)) terminal 210, a first negative terminal 212, a second positive (e.g., a first 12 V) terminal 214, a third positive (e.g., a second 12 V) terminal 216, and a second negative terminal 220. While the example of the battery 208 having a 48 V operating voltage and two 12 V operating voltages is provided, the battery 208 may have one or more other operating voltages, such as only two 12 V operating voltages, only two 48 V operating voltages, two 48 V operating voltages and a 12 V operating voltage, or a combination of two or more other suitable operating voltages.

The battery 208 includes a plurality of individual batteries, such as a first battery 224-1, . . . , and an N-th battery 224-N ("batteries 224") of an adjustable battery system 226, where N is an integer greater than or equal to 2. In various implementations, N may be equal to 6, 8, 10, or 12. Each of the batteries 224 may include one or more battery cells, and each of the batteries 224 may be separately replaceable within the battery 208. For example only, each of the batteries 224 may be an individually housed 12 V DC battery. The ability to individually replace the batteries 224 may enable the battery 208 to include a shorter warranty period and have a lower warranty cost. The batteries 224 are also individually isolatable, for example, in the event of a fault in a battery module. In various implementations, the battery 208 may have the form factor of a standard automotive grade 12 V battery.

Each of the batteries 224 has its own separate capacity (e.g., in amp hours, Ah). The battery 208 includes a plurality of switches, such as first switches 232-1, . . . , N-th switches 232-N (collectively "switches 232"). The switches 232 enable the batteries 224 to be connected in series, parallel, or combinations of series and parallel to provide desired output voltages and capacities at the output terminals. A switch control module 240 controls the switches 232 to provide desired output voltages and capacities at the output terminals. The switch control module 240 controls the switches 232 to vary the capacity provided at the output terminals.

In some examples, the battery 208 may include one or more individual standard batteries, such as a first battery 244-1, . . . , and an M-th battery 244-M ("batteries 244"), where M is an integer greater than or equal to 2. As used herein, a "standard" battery corresponds to a non-adjustable battery having a fixed output voltage, such as an individual cell or module comprising a plurality of cells.

Figure 3A:
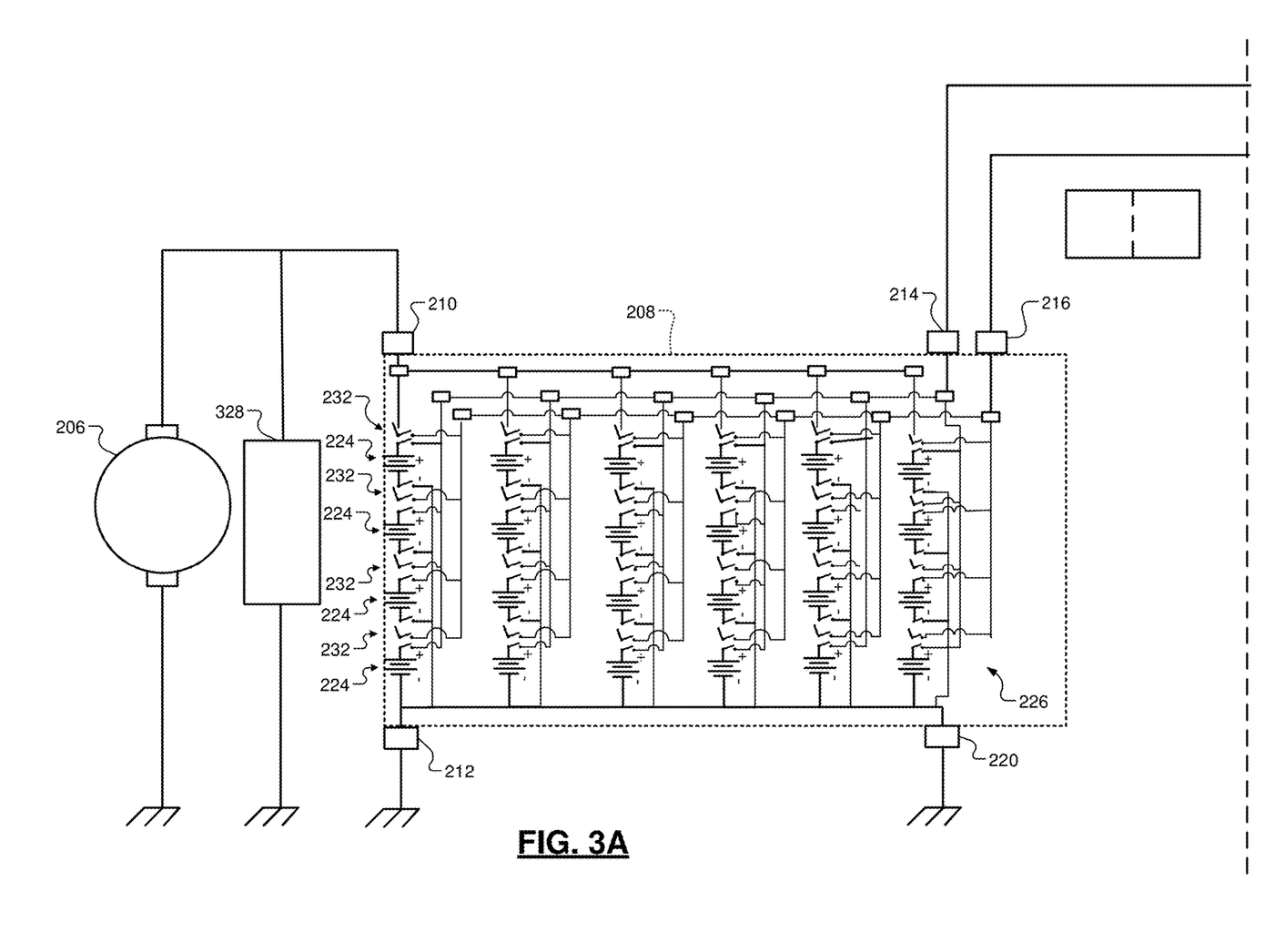
FIGS. 3A-3B are a schematic including an example implementation of a battery and battery system.
Figure 3B:
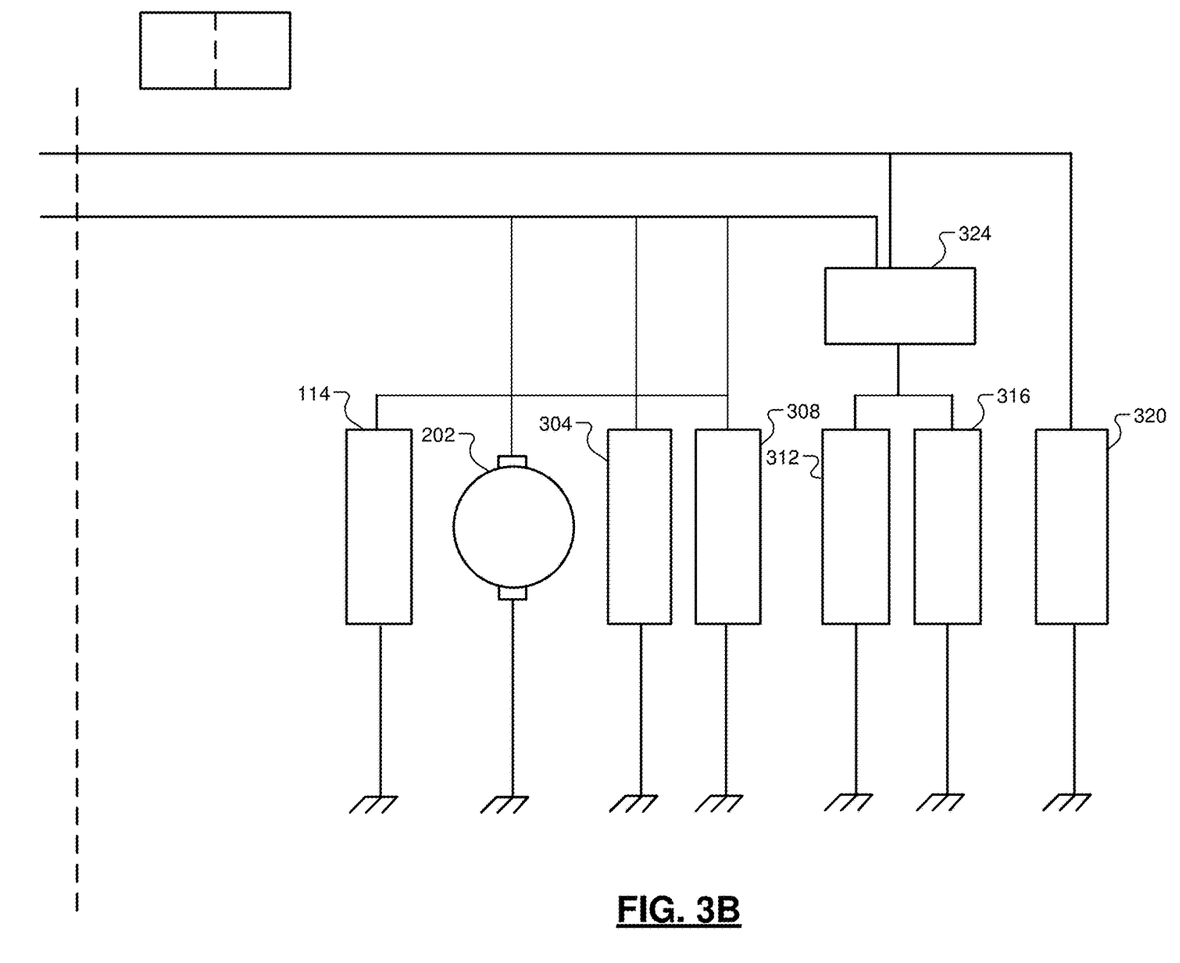

FIGS. 3A-3B are a schematic including an example implementation of the adjustable battery system 226 of the battery 208. In the example of FIG. 3A, sets of 4 of the batteries 224 (e.g., 12 V batteries) are connectable in series (via ones of the switches 232) to the first positive terminal 210 and the first negative terminal 212 to provide a first output voltage (e.g., 48 V). Individual ones of the batteries 224 can be connected (via ones of the switches 232) to the second positive terminal 214 or the third positive terminal 216 and the second negative terminal 220 to provide a second output voltage (e.g., 12 V) at the second and third positive terminals 214 and 216. How many of the batteries 224 are connected to the first positive terminal 210, the second positive terminal 214, and the third positive terminal 216 dictates the portions of the overall capacity of the battery 208 available at each of the positive terminals.

As shown in FIG. 3B, a first set of vehicle electrical components operates using one of the two or more operating voltages of the battery 208. For example, the first set of vehicle electrical components may be connected to the second and third positive terminals 214 and 216. Some of the first set of vehicle electrical components may be connected to the second positive terminal 214, and some of the first set of vehicle electrical components may be connected to the third positive terminal 216. The first set of vehicle electrical components may include, for example but not limited to, the ECM 114 and other control modules of the vehicle, the starter motor 202, and/or other electrical loads, such as first 12 V loads 304, second 12 V loads 308, other control modules 312, third 12 V loads 316, and fourth 12 V loads 320. In various implementations, a switching device 324 may be connected to both of the first and second positive terminals 214. The switching device 324 may connect the other control modules 312 and the third 12 V loads 316 to the second positive terminal 214 or the third positive terminal 216.

As shown in FIG. 3A, a second set of vehicle electrical components operates using another one of the two or more operating voltages of the battery 208. For example, the second set of vehicle electrical components may be connected to the first positive terminal 210. The second set of vehicle electrical components may include, for example but not limited to, the generator 206 and various electrical loads, such as 48 V loads 328. The generator 206 may be controlled to recharge the battery 208.

Each of the switches 232 may be an insulated gate bipolar transistor (IGBT), a field effect transistor (FET), such as a metal oxide semiconductor FET (MOSFET), or another suitable type of switch.

Figure 4:
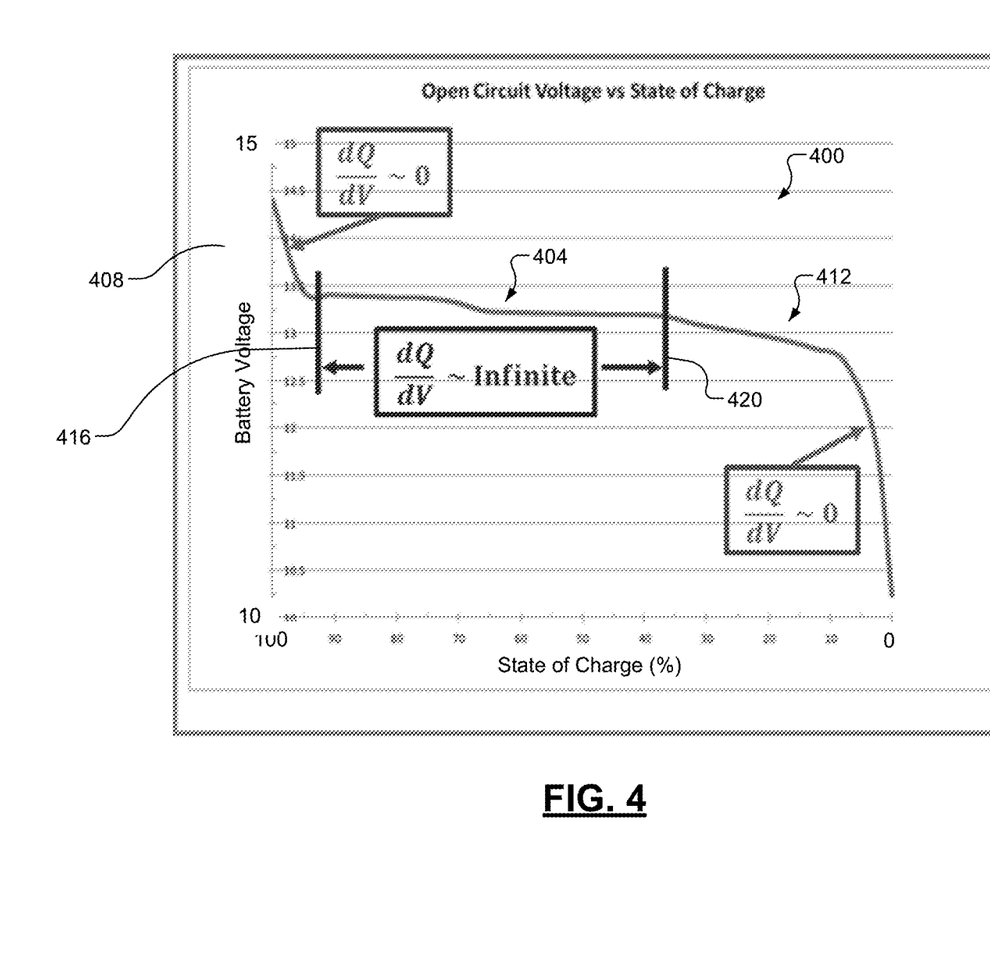
FIG. 4 shows state of charge (SOC) vs. open circuit voltage (OCV) for a battery chemistry having a flat voltage profile.

The battery system (e.g., the hybrid control module 196) according to the present disclosure is configured to calculate SOC using differential capacity (dQ/dV) and/or differential voltage (dV/dQ) inflection points in the voltage profile of the battery, calculate and report accurate SOC, SOH, and power availability without performing a reconfirmation process at 0 or 100% SOC, and perform cell balancing during vehicle and battery use as described below in more detail. Referring now to FIG. 4, SOC vs. OCV (for a decreasing SOC) is shown for a battery chemistry having a flat voltage profile 400. The voltage profile 400 includes a relatively flat region 404 (e.g., between an SOC of approximately 35 and 90%). In the flat region 404, dQ/dV is approximately infinite. In other words, very small changes in battery OCV correspond to very large changes in SOC. For example, as OCV varies by as little as 50 mV, SOC varies by 50% or more. Accordingly, accurate calculation of SOC using OCV is limited to a region 408 above 90% SOC and a region 412 below 35% SOC. Although as shown the voltage profile 400 is divided into three regions 404, 408, and 412, fewer or more regions may be defined.

Respective transitions ("inflection points") between the flat region 404 and either of the regions 408 or 412 (e.g., inflection points 416 and 420) may be used to calculate SOC using the principles of the present disclosure. For example, for a given battery chemistry with a flat voltage profile, these inflection points 416 and 420 may be relatively constant relative to a predetermined SOC (e.g., 100%). The inflection point 416 can be detected by observing a variation in a rate of change in OCV as SOC approaches and crosses the inflection point 416. In other words, as SOC increases, dQ/dV will abruptly decrease from near infinity as SOC crosses the inflection point 416 (or, dQ/dV will abruptly increase as SOC decreases past the inflection point 416). Changes in OCV relative to SOC increase in the regions 408 and 412 and decrease (e.g., to nearly undetectable amounts) in the flat region 404. In this manner, SOC can be calculated without charging to 100% or discharging to 0% by using a measured OCV and known or learned inflection points 416 and 420.

Although described with respect to battery chemistries having a flat voltage profile, the principles of the present disclosure may be applied to other types of battery chemistries (i.e., battery chemistries having non-flat (sloped) voltage profiles) that include detectable inflection points, such as batteries having nickel manganese cobalt (NMC), nickel cobalt oxide (NCO), and/or lithium ion manganese oxide (LMO) cathodes and graphite and/or lithium titanate (LTO) anodes.

Figure 5A:
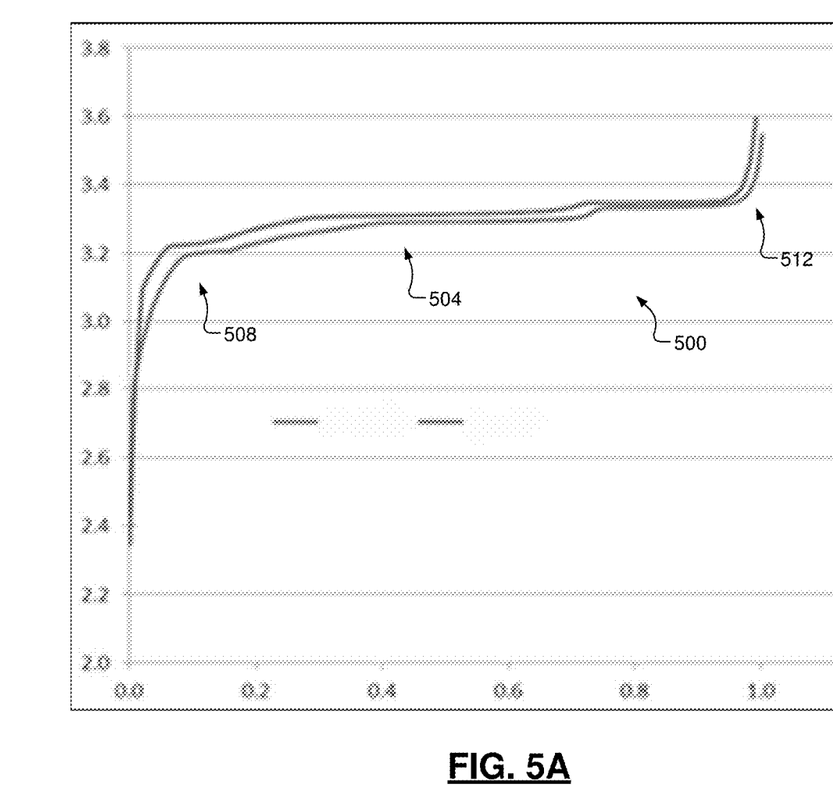
FIG. 5A shows another example of SOC vs. OCV for a battery chemistry having a flat voltage profile.
Figure 5B:
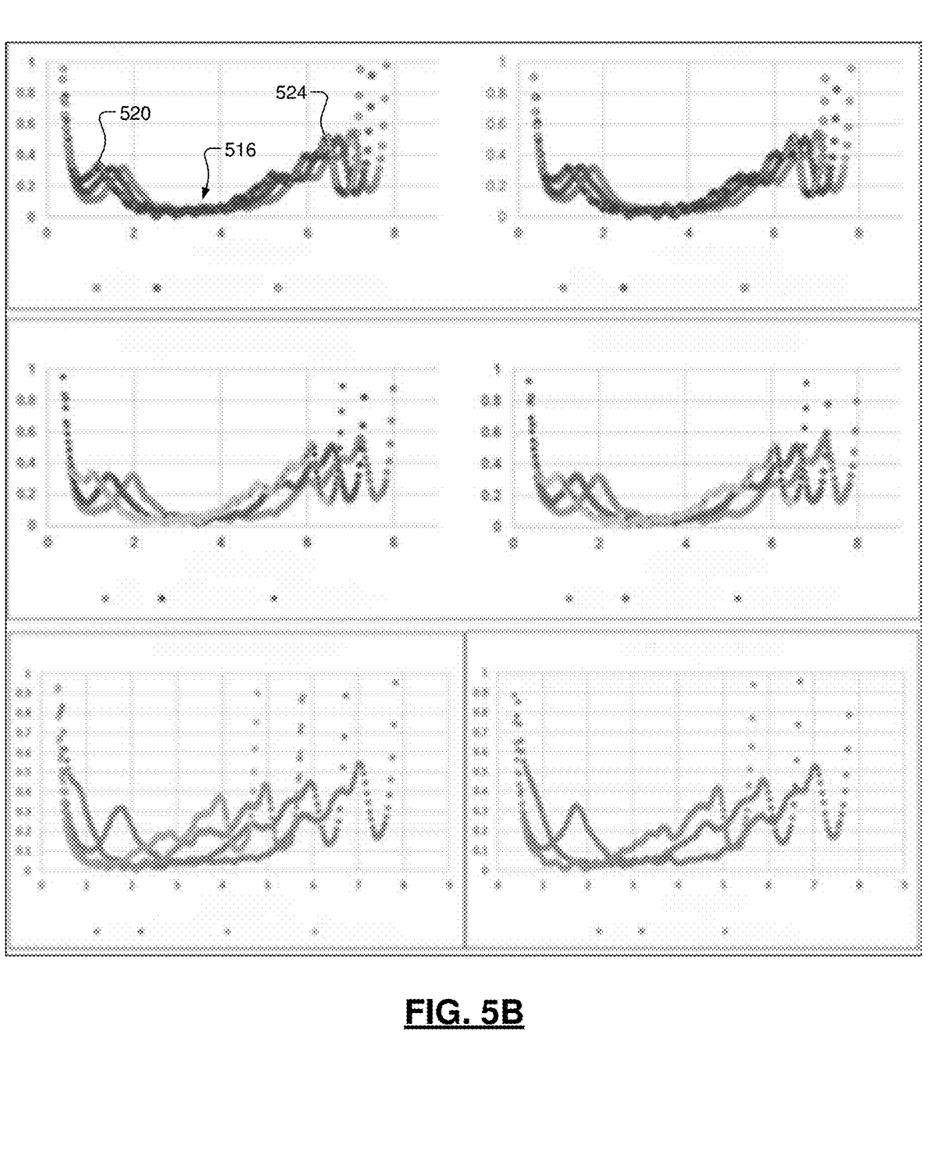
FIG. 5B shows dQ/dV vs. capacity for example cells and battery ages.

FIG. 5A shows another example of SOC vs. OCV (for an increasing SOC) for a battery chemistry having a flat voltage profile 500 with a flat region 504 and dQ/dV inflection points 508 and 512. FIG. 5B shows dQ/dV vs. capacity (in ampere hours (Ah), which is indicative of SOC) for a variety of example cells and battery ages (e.g., beginning of life (BoL), 1000 cycles, and 2000 cycles). As shown in FIG. 5B, dQ/dV includes a trough 516 corresponding to the flat region 504 and peaks 520 and 524 corresponding to the inflection points 508 and 512. Positions of the peaks 520 and 524 (e.g., corresponding to a relative distance or an absolute distance from a predetermined SOC, such as 0% or 100%) are generally constant.

Further, a distance between the peaks 520 and 524 (corresponding to capacity) is generally constant, and energy (e.g., in ampere hours) between the peaks 520 and 524 can be measured while the battery is operated (either during charge or discharge). The measured energy may be indicative of various battery characteristics. For example, the measured energy may be generally constant during a useful life of the battery. Conversely, the measured energy may decrease as an end of life (EOL) of the battery approaches. Accordingly, measuring the energy between the detected peaks 520 and 524 may be used to determine remaining life and/or SOH of the battery, and may be used to detect bad or aging cells in the battery.

Figure 6:
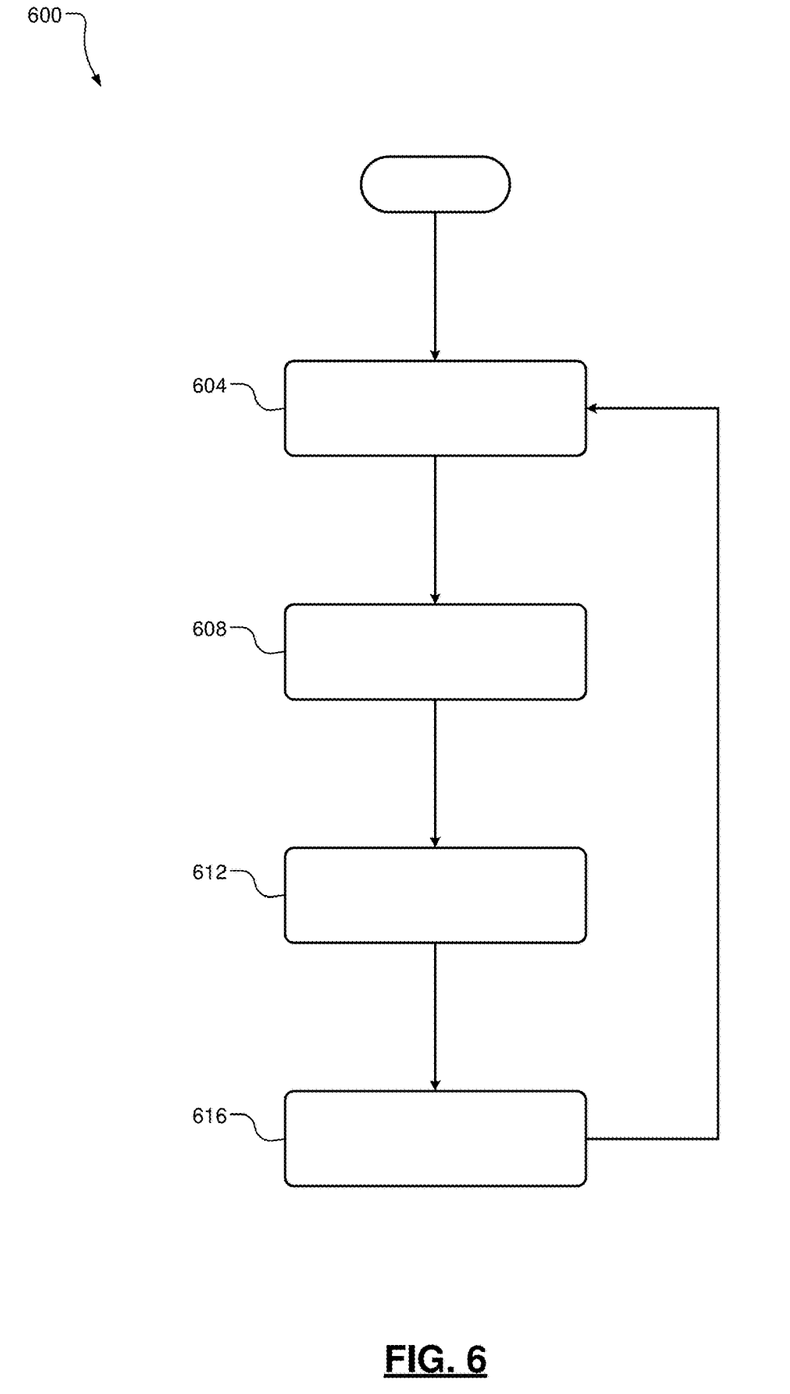
FIG. 6 shows steps of an example method of determining battery characteristics using dQ/dV inflection points.

FIG. 6 shows a method 600 of determining various battery characteristics (e.g., SOC, SOH, etc.) using dQ/dV inflection points. At 604, the method 600 (e.g., the hybrid control module 196) determines and stores dQ/dV inflection points for a battery (e.g., for specific battery, battery type, battery chemistry, etc.). The dQ/dV inflection points may be determined during manufacturing, prior to installation, during a calibration procedure, and/or during operating of a vehicle including the battery. In other words, the dQ/dV inflection points may be predetermined and/or dynamically determined. The stored dQ/dV inflection points may be indexed to respective SOCs of the battery at the inflection points.

At 608, the method 600 (e.g., the hybrid control module 196) detects the dQ/dV inflection points during operation of the battery. For example, during use, dQ/dv is monitored (e.g., by measuring OCV, calculating SOC, etc.) to determine when dQ/dV decreases sharply (e.g. from near-infinite to near-zero value) or increases sharply (e.g., from near-zero to near-infinite value) as SOC crosses one of the inflection points 508 and 512.

At 612, the method 600 (e.g., the hybrid control module 196) estimates and report SOC in response to one of the inflection points 508 and 512 being detected. For example, the method 600 identifies which of the inflection points 508 and 512 was detected and estimates a SOC of the battery based on the SOC indexed to the inflection point. At 616, the method 600 selectively calculates one or more other battery characteristics using the identified inflection points, including, but not limited to, energy between the inflection points, SOH of the battery, remaining life of the battery, etc. The method 600 then returns to 608 to continue to monitor dQ/dV.

The battery system (e.g., the hybrid control module 196) according to the present disclosure may be further configured to perform cell balancing during vehicle and battery use. For example, the hybrid control module 196 may be configured to control switches such as the switches 232 to separately connect cells of a battery to ground to discharge individual cells (e.g., to allow a controlled discharge current). In this manner, individual cells that have a significantly higher voltage than other cells (causing imbalance) may be discharged to levels similar to the other cells, allowing charging of cells having a lower voltage.

Figures 7A, 7B, 7C:
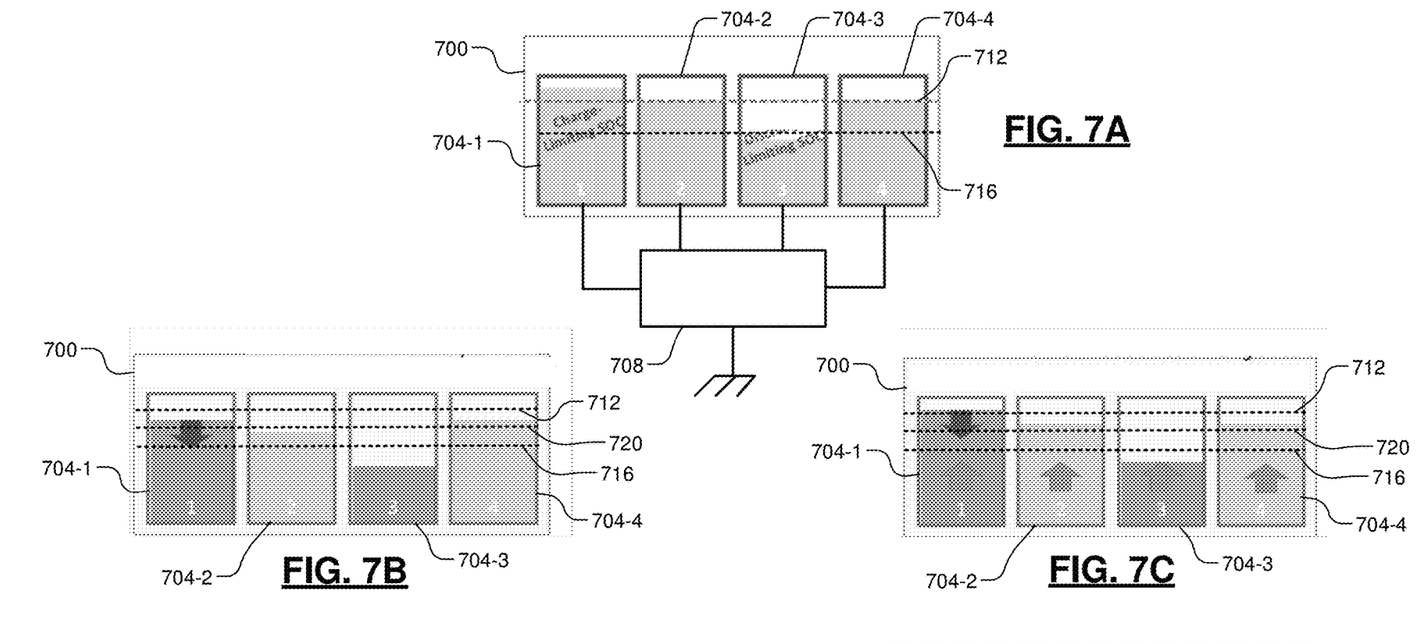
FIGS. 7A through 7E show an example cell balancing process according to the principles of the present disclosure.

FIGS. 7A through 7E show an example cell balancing process according to the principles of the present disclosure. FIG. 7A shows a battery 700 (e.g., corresponding to one of the batteries 224 described above) including cells 704-1, 704-2, 704-3, and 704-4, referred to collectively as cells 704. The hybrid control module 196 (e.g., using the switch control module 240) operates switches 708 to selectively connect individual ones of the cells 704 to ground to allow a controlled discharge current to flow and discharge the connected cells 704. Others of the cells 704 may simultaneously be charged (e.g., via generator 206 or another cell balancing/charging system) to charge the cells 704 while the connected cells 704 are discharging.

As shown in FIG. 7A, the cell 704-1 has a voltage above an upper limit 712. For example, the cells 704 may not be permitted to be charged above the upper limit 712. Accordingly, the cell 704-1 corresponds to a charge-limiting cell. Conversely, the cell 704-3 has a voltage below a lower limit 716. Accordingly, the cell 704-3 cannot be used to provide power and corresponds to a discharge-limiting cell. Accordingly, a significant imbalance between the cells 704-1 and 704-3 limits the ability of the battery 700 to be charged or discharged. Further, the battery 700 cannot be charged or discharged to confirm the SOC of the battery 700. In other words, since the battery 700 cannot be charged to 100% SOC or discharged to 0%, SOC cannot be accurately determined.

As shown in FIG. 7B, cell balancing is turned ON for the cell 704-1. Cell balancing may be triggered when an estimated SOC for the battery 700 is above a threshold (e.g., 85%), whenever the battery 700 is being charged, etc. For example, the cell 704-1 is connected to ground to allow a discharge current to flow. Accordingly, the voltage of the cell 704-1 begins to decrease below the upper limit 712. As shown in FIG. 7C, the battery 700 is charged while the cell 704-1 continues to be discharged. Accordingly, the voltages of the cells 704-2, 704-3, and 704-4 begin to increase. The voltage of the cell 704-1 may increase, decrease, or remain relatively constant depending upon relative discharge and charge rates.

Figure 7D:
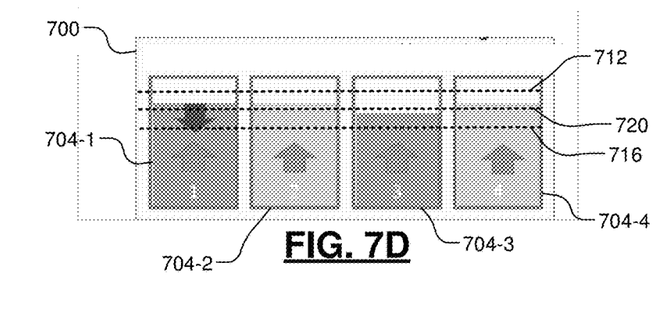
Figure 7E:
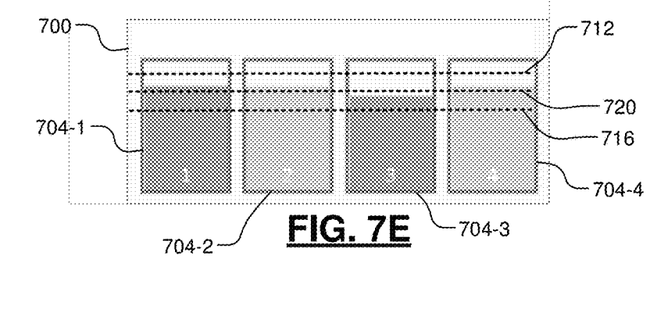

As shown in FIG. 7D, cell balancing continues as the cell 704-1 continues to discharge while the cells 704-2, 704-3, and 704-4 are charged. Any other cells 704 that reach the upper limit 712 may be connected to ground via the switches 708 to be discharged. As shown in FIG. 7E, the operation shown in FIGS. 7B, 7C, and 7D may be repeated (i.e., cycled) until each of the cells 704 reaches a predetermined threshold 720. For example, the threshold 720 may correspond to a desired overall SOC of the battery 700. As shown, the threshold 720 is between the upper limit 712 and the lower limit 716. The threshold 720 may correspond to an SOC associated with a dQ/dV inflection point, such as the inflection point 512. In this manner, the cell balancing process may be use to both balance the cells 704 and reconfirm the SOC of the battery 700.

During or subsequent to the balancing process, the SOC may be set in accordance with voltage values of one or more of the cells 704. For example, the SOC may be set based on a relationship between a maximum voltage of one of the cells 704 and a minimum voltage of another one of the cells 704. In one example, the SOC may be set to 100% if the maximum voltage of one of the cells 704 is greater than or equal to a maximum charge and the minimum voltage of one of the cells is within a first predetermined range of the maximum charge, 95% if the maximum voltage of one of the cells 704 is greater than or equal to the maximum charge and the minimum voltage of one of the cells is within a second predetermined range of the maximum charge, 90% if the maximum voltage of one of the cells 704 is greater than or equal to the maximum charge and the minimum voltage of one of the cells is within a third predetermined range of the maximum charge, 85% if the maximum voltage of one of the cells 704 is greater than or equal to the maximum charge and the minimum voltage of one of the cells is within a fourth predetermined range of the maximum charge, etc.

In some examples, a magnitude of an imbalance (e.g., a difference between a maximum voltage of one of the cells 704 and a minimum voltage of one of the cells 704 may be associated with different fault levels that are reported to the vehicle and/or a user, different performance limitations or adjustments, etc. For example, a first fault level may be associated with a first imbalance (i.e., a difference between a maximum voltage of one of the cells 704 and a minimum voltage of one of the cells 704), such as greater than 15 mV and less than 50 mV. A second fault level may be associated with a second imbalance, such as greater than or equal to 50 mV and less than 100 mV. A third fault level may be associated with a third imbalance, such as greater than 100 mV.

The first fault level may prompt a notification to a user, such as activating an LED or generating and setting a flag. The second fault level may prompt an additional notification (e.g., a check engine light), a warning that the reported SOC may be greater than the actual available SOC, etc. The third fault level may prompt a warning that immediate servicing is recommended.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. While vehicle examples are provided, the principles of the present disclosure are also applicable to non-vehicle implementations. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A battery system, comprising:
   at least one battery including a plurality of cells; and
   a hybrid control module configured to
      monitor a differential capacity of the at least one battery,
      determine when the monitored differential capacity of the at least one battery corresponds to a predetermined differential capacity of the at least one battery, and
      determine a state of charge of the battery in response to the determination that the monitored differential capacity corresponds to the predetermined differential capacity,
   wherein determining the state of charge of the battery includes (i) identifying an inflection point in a voltage profile of the at least one battery, wherein the inflection point corresponds to a transition between a non-flat region and a generally flat region in the voltage profile, and (ii) indexing the identified inflection point to the state of charge of the battery.

2. The battery system of claim 1, wherein, in the generally flat region, an open circuit voltage of the battery varies by less than 100 mV and the state of charge varies by at least 50%.

3. The battery system of claim 1, wherein the hybrid control module is further configured to:
   determine when the monitored differential capacity of the at least one battery corresponds to a second predetermined differential capacity of the at least one battery, wherein the predetermined differential capacity corresponds to a first inflection point in the voltage profile of the at least one battery and the second predetermined differential capacity corresponds to a second inflection point in the voltage profile of the at least one battery; and
   calculate an energy of the battery between the first inflection point and the second inflection point.

4. The battery system of claim 3, wherein the hybrid control module is further configured to calculate at least one of a state of health of the battery and a remaining life of the battery based on the calculated energy.

5. A vehicle comprising the battery system of claim 1.

* * * * *